United States Patent
Cavaliere et al.

(10) Patent No.: US 9,883,714 B2
(45) Date of Patent: Feb. 6, 2018

(54) SOLE PLATE ASSEMBLY AND METHOD OF MAKING

(71) Applicant: Nike, Inc., Beaverton, OR (US)

(72) Inventors: Sergio Cavaliere, Venezia (IT); Giovanni Adami, Montebelluna (IT); Timothy J. Smith, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 151 days.

(21) Appl. No.: 13/917,858

(22) Filed: Jun. 14, 2013

(65) Prior Publication Data

US 2014/0366402 A1     Dec. 18, 2014

(51) Int. Cl.
| | |
|---|---|
| A43B 5/00 | (2006.01) |
| A43B 13/14 | (2006.01) |
| A43B 13/02 | (2006.01) |
| A43B 5/02 | (2006.01) |
| A43B 13/04 | (2006.01) |
| A43B 13/12 | (2006.01) |

(Continued)

(52) U.S. Cl.
CPC ............ *A43B 13/14* (2013.01); *A43B 5/00* (2013.01); *A43B 5/02* (2013.01); *A43B 13/02* (2013.01); *A43B 13/04* (2013.01); *A43B 13/122* (2013.01); *A43B 13/26* (2013.01); *A43C 15/16* (2013.01); *A43C 15/161* (2013.01); *B29D 35/122* (2013.01); *B29D 35/142* (2013.01)

(58) Field of Classification Search
CPC ......... A43B 13/14; A43B 13/22; A43B 13/04; A43B 5/02; A43C 13/04; A43C 15/16; A43C 15/00; B29D 35/122; B29D 35/142

USPC .............. 36/59 R, 67 D, 62, 124, 126, 67 A
See application file for complete search history.

(56) References Cited

U.S. PATENT DOCUMENTS

| | | | |
|---|---|---|---|
| 3,054,197 A * | 9/1962 | Morgan | ............... A43C 15/161 |
| | | | 36/59 R |
| 3,600,831 A | 8/1971 | Olsson | |

(Continued)

FOREIGN PATENT DOCUMENTS

| | | |
|---|---|---|
| CN | 102665467 A | 9/2012 |
| FR | 2 532 825 A1 | 3/1984 |

(Continued)

OTHER PUBLICATIONS

"Through", dictionary.com. web. retrieved Apr. 18, 2017, http://www.dictionary.com/browse/through?s=t.*

(Continued)

*Primary Examiner* — Sally Haden
*Assistant Examiner* — Jillian K Pierorazio
(74) *Attorney, Agent, or Firm* — Honigman Miller Schwartz and Cohn LLP; Matthew H. Szalach; Jonathan P. O'Brien

(57) ABSTRACT

An ultra-lightweight sole plate assembly can include a ground engaging outer shell, a structural component, and one or more cleat members. A method of making the outer shell includes thermoforming a foil material such as polyamide. Thermoforming the foil includes applying vacuum to the foil material. Excess foil material can be trimmed from the outer shell. The structural component can be made by injecting a molding material onto the outer shell. The cleat members can be co-molded with the shell during forming of the structural component. The resulting sole plate assembly has a reduced weight with the desired traction, strength and durability.

20 Claims, 15 Drawing Sheets

(51) Int. Cl.
*A43B 13/26* (2006.01)
*A43C 15/16* (2006.01)
*B29D 35/12* (2010.01)
*B29D 35/14* (2010.01)

(56) References Cited

U.S. PATENT DOCUMENTS

| | | | |
|---|---|---|---|
| 3,814,781 A | 6/1974 | Shoji | |
| 3,925,529 A | 12/1975 | Bernier et al. | |
| 4,348,003 A | 9/1982 | Beneteau | |
| 4,674,207 A | 6/1987 | Yamaguchi | |
| 4,698,923 A * | 10/1987 | Arff | A43B 13/26 36/128 |
| 4,787,156 A | 11/1988 | Bade | |
| 5,657,556 A * | 8/1997 | Bemis | A43B 13/12 12/142 P |
| 5,832,636 A | 11/1998 | Lyden et al. | |
| 6,367,167 B1 | 4/2002 | Krstic et al. | |
| 6,748,677 B2 * | 6/2004 | Briant | A43B 13/26 36/134 |
| 6,954,998 B1 | 10/2005 | Lussier | |
| 6,968,637 B1 | 11/2005 | Johnson | |
| 7,263,788 B2 | 9/2007 | Johnson | |
| 2004/0262819 A1 | 12/2004 | Lee | |
| 2005/0198868 A1* | 9/2005 | Scholz | A43B 3/24 36/67 D |
| 2006/0021254 A1* | 2/2006 | Jones | A43C 15/14 36/61 |
| 2010/0083541 A1* | 4/2010 | Baucom | A43B 1/0018 36/25 R |
| 2010/0107450 A1* | 5/2010 | Locke | A43C 13/04 36/134 |
| 2010/0162590 A1* | 7/2010 | Bonigk | 36/103 |
| 2010/0293816 A1* | 11/2010 | Truelsen | 36/30 R |
| 2010/0307025 A1 | 12/2010 | Truelsen et al. | |
| 2011/0088287 A1 | 4/2011 | Auger et al. | |
| 2011/0107622 A1* | 5/2011 | Schwirian | 36/30 A |
| 2011/0197475 A1* | 8/2011 | Weidl et al. | 36/107 |
| 2012/0266490 A1* | 10/2012 | Atwal | A43C 15/161 36/62 |
| 2013/0340295 A1* | 12/2013 | Adami | A43B 5/02 36/25 R |
| 2014/0345166 A1* | 11/2014 | Koch | A43C 15/161 36/134 |

FOREIGN PATENT DOCUMENTS

| | | |
|---|---|---|
| TW | 233432 | 11/1994 |
| TW | 201236593 A | 9/2012 |

OTHER PUBLICATIONS

"Within", dictionary.com. web. retrieved Apr. 18, 2017, http://www.dictionary.com/browse/within?s=t.*
International Search Report and Written Opinion dated Sep. 8, 2014 in PCT/US2014/038084.
State Intellectual Property Office (P.R.C.), Chinese Office Action for Chinese Application No. 201480002646.1, dated Oct. 29, 2015.
Intellectual Property Office, R.O.C. (Taiwan), Office Action for Taiwan Patent Application 103113738, dated Aug. 17, 2015.
Korean Patent Office, Office Action for KR Application No. 10-2015-7007407, dated Jun. 16, 2016.
Korean Patent Office, Office Action for KR Application No. 10-2015-7007407, dated Jan. 31, 2017.
European Patent Office, Office Action for EP Application No. 14735703.2, dated Aug. 3, 2017.

* cited by examiner

SOLE PLATE ASSEMBLY AND METHOD OF MAKING

BACKGROUND

The present embodiments relate generally to articles of footwear, and in particular to articles of footwear with sole systems.

Articles of footwear generally include two primary elements: an upper and a sole system. The upper is often formed from a plurality of material elements (e.g., textiles, polymer sheet layers, foam layers, leather, and synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing or other closure system to adjust the fit of the footwear, as well as permitting entry and removal of the foot from the void within the upper.

Sole systems can include one or more components. These can include outsoles, midsoles, insoles, inserts, bladders and/or airbags as well as possibly other components.

SUMMARY

In one aspect, an article of footwear includes a sole structure, where the sole structure includes an outer shell of a thermoformed foil material. The article of footwear also includes a structural component injection molded on the outer shell. The article of footwear also includes pre-formed cleat tips.

In another aspect, a method of making an article of footwear having a sole structure includes thermoforming a foil material to form an outer shell of the sole structure.

In another aspect, a method of making an article of footwear having a sole structure includes thermoforming a foil to form an outer shell of the sole structure, arranging pre-formed cleat tips and the outer shell in a mold, and injecting a molding material into the mold to form a structural component.

Other systems, methods features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

An exemplary method for forming an ultra-lightweight sole plate assembly is disclosed herein. Generally, the term "sole plate assembly" as used in this detailed description refers to a collection of one or more components that may comprise part or all of a sole system for an article of footwear. The sole plate assembly can include an element configured to be disposed as an outsole for an article of footwear and may also include one or more cleat members. In addition, the sole plate assembly could include additional components, such as reinforcing components. For purposes of illustration, the sole plate assembly is shown in isolation in various embodiments. In other embodiments, however, the sole plate assembly could be associated with an upper for an article of footwear. It should be noted that the sole plate assembly could take the form of an outsole or a sole structure for any article of footwear including, but not limited to: hiking boots, soccer shoes, football shoes, sneakers, rugby shoes, basketball shoes, baseball shoes, track shoes, as well as other kinds of shoes.

In an exemplary embodiment, a sole plate assembly may extend through the entire length and/or width of a sole system for an article of footwear. In other embodiments, a sole plate assembly may only be associated with a portion of a sole system, including, but not limited to one or more of a forefoot region, a midfoot region, and/or a heel region. Although the embodiments depict a sole plate assembly that is associated with an outsole for an article of footwear, in other embodiments the sole plate assembly could be associated with other portions of a sole system such as a midsole and/or insole.

Figure 1:
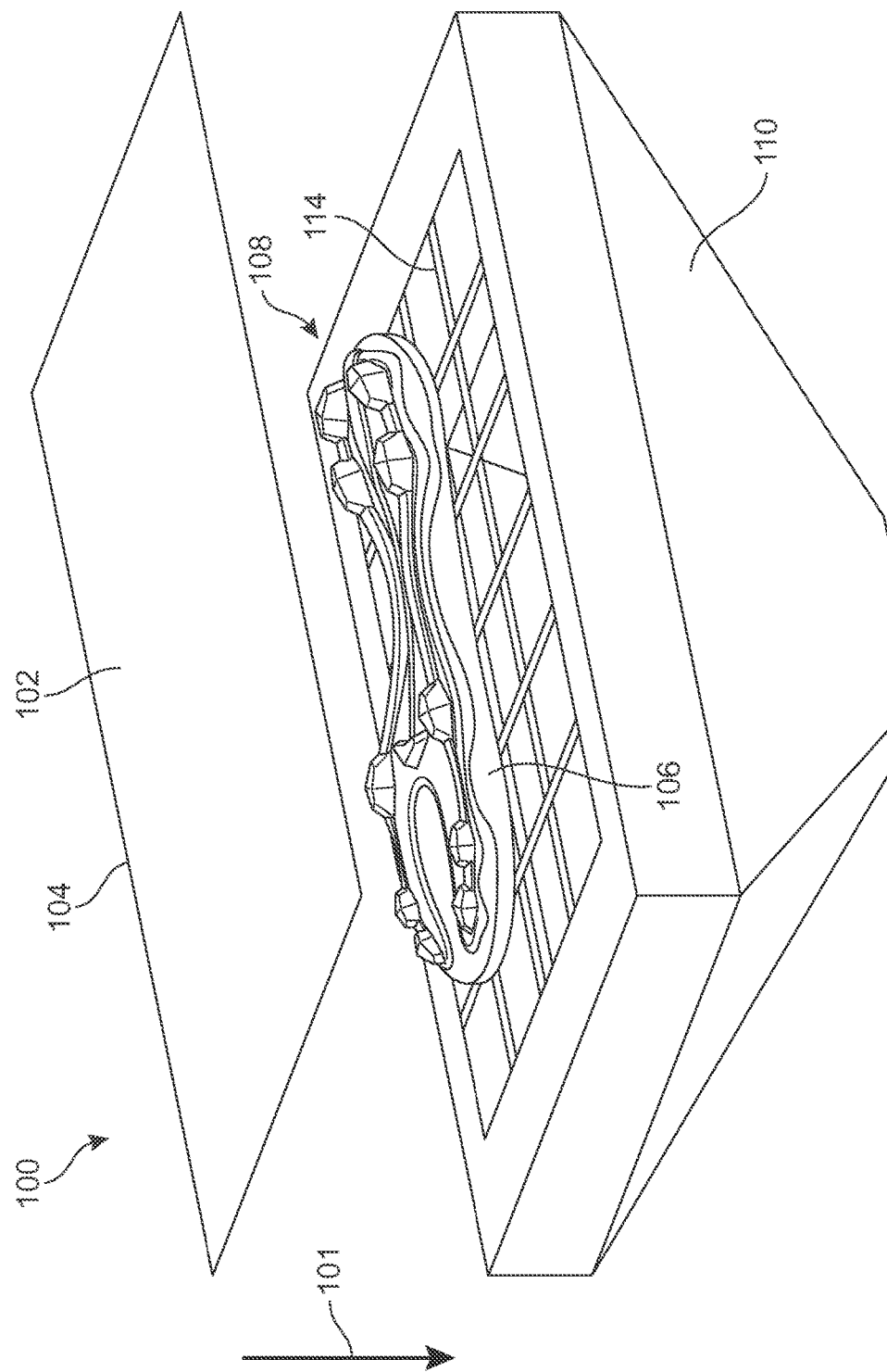
FIG. 1 is an isometric view showing an embodiment of a vacuum molding system for making an embodiment of a plate member of a sole plate assembly.

FIG. 1 is a perspective view showing an embodiment of a molding system 100 for making a plate member of a sole plate assembly. In one embodiment, a step may include forming an outer layer of a sole plate assembly. In an exemplary embodiment, the outer layer may be formed from a sheet 104 of material 102.

In some embodiments, sheet 104 of material 102 may have a generally two-dimensional shape. In other words, in some embodiments, sheet 104 may have a length and width that is substantially greater than a thickness of sheet 104. In some embodiments, sheet 104 may be a substantially thin foil. In some embodiments, the thickness of sheet 104 may have any value approximately in the range of 0.15 mm to 0.5 mm. In other embodiments, the thickness of sheet 104 could be less than 0.15 mm. In still other embodiments, the thickness of sheet 104 could be greater than 0.5 mm. Moreover, the thickness selected for sheet 104 may be determined according to various factors including the type of material used, desired structural properties and manufacturing considerations.

In different embodiments, material 102 could be any kind of material known in the art for making sheets, foils or other relatively thin layers of material. Exemplary materials that could be used include, but are not limited to: plastics, metals, as well as possibly other materials. In some embodiments, material 102 may be a plastic material. In one embodiment, material 102 could be a polyamide foil. In another embodiment, material 102 could be a thermoplastic polyurethane foil.

In order to shape sheet 104, in one embodiment, sheet 104 of material 102 may be placed over a mold 106. In an embodiment shown, mold 106 may be in the form of the bottom of a sole structure. In some embodiments, mold 106 may include provisions for making a matched pair of plate members associated with a right foot and a left foot. In other embodiments, mold 106 may include provisions for forming plate members associated with either foot. Additionally, in other embodiments, mold 106 may include provisions to form different or similar plate members.

In an exemplary embodiment, sheet 104 of material 102 can be positioned over mold 106, for example, by a mechanism or manually (not shown for simplicity). Positioning of the sheet 104 onto mold 106 is illustrated by arrow 101. Any suitable mechanism for positioning sheet 104 relative to mold 106 may be provided.

In one embodiment, mold 106 may be positioned in the vicinity of a vacuum source 110. For purposes of clarity, vacuum source 110 is shown schematically in the embodiments. In some embodiments, vacuum source 110 could be a vacuum table or similar device. Any device suitable for holding mold 106 relative to vacuum source 110 may be provided. In an exemplary embodiment, a screen element 114 may be provided to support mold 106 over vacuum source 110. It will be understood that any type of vacuum may be employed.

Figure 2:
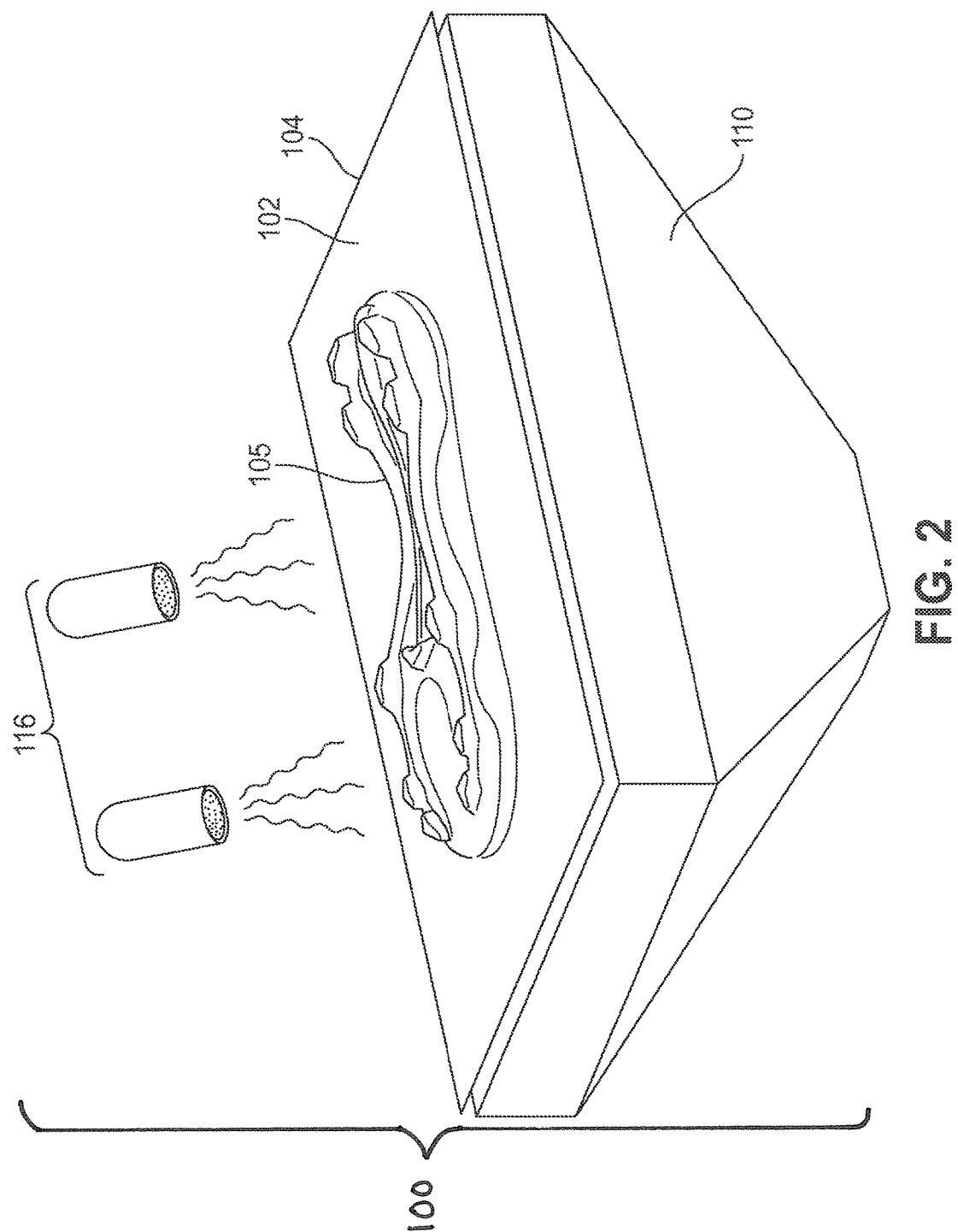
FIG. 2 is an isometric view of an embodiment of a vacuum molding system during a step of forming a plate member.

Referring to FIG. 2, an embodiment of molding system 100 during a step of applying vacuum to sheet 104 is shown. In some embodiments, sheet 104 may be pressed against mold 106 using vacuum source 110. Sheet 104 can be formed into the shape of mold 106 by applying a vacuum to the flat sheet 104. In one embodiment, sheet 104 is shown being drawn onto mold 106 by suction from the vacuum provided by vacuum source 110, through screen element 114. Additionally, sheet 104 is shown conforming to the shape of mold 106, as can been seen by mold impression 105 on sheet 104. In other embodiments, sheet 104 may be formed by compression, using a two-sided mold, which is described in further detail below.

In one embodiment, sheet 104 of material 102 may be thermoformed against mold 106. Thermoforming is a process where a material, typically a plastic in sheet form, is heated to a pliable forming temperature, formed to a specific shape, and trimmed to a finished shape. Other initial shapes of material can be employed other than sheet form. In some cases, the material is heated to a high-enough temperature so that it can be stretched into or onto a mold and cooled to form a set shape. Forming of the material can include vacuum, compression, and/or pressure forming, although both the heating and forming may be accomplished in any suitable manner and are not restricted to the exemplary methods described here.

During thermoforming in some embodiments, heat may be applied to sheet 104 by heat source 116, while sheet 104 is suctioned onto mold 106. Exemplary heat sources that could be used include lamps, electric heaters as well as possibly other heat sources known in the art.

In the embodiment shown in FIG. 2, sheet 104 can be thermoformed by applying heat and vacuum. In such an embodiment, the thermoformed foil material may have properties such as flexibility and durability that are desirable in an outsole, for example. Methods of thermoforming and thermoforming systems, which may be included in some aspects of some embodiments of the present application, are disclosed in Adami et al, U.S. Pat. No. 9,839,255 issued Dec. 12, 2017, and entitled "SOLE STRUCTURE FOR ARTICLE OF FOOTWEAR", the entirety of which is hereby incorporated by reference.

Figure 3:
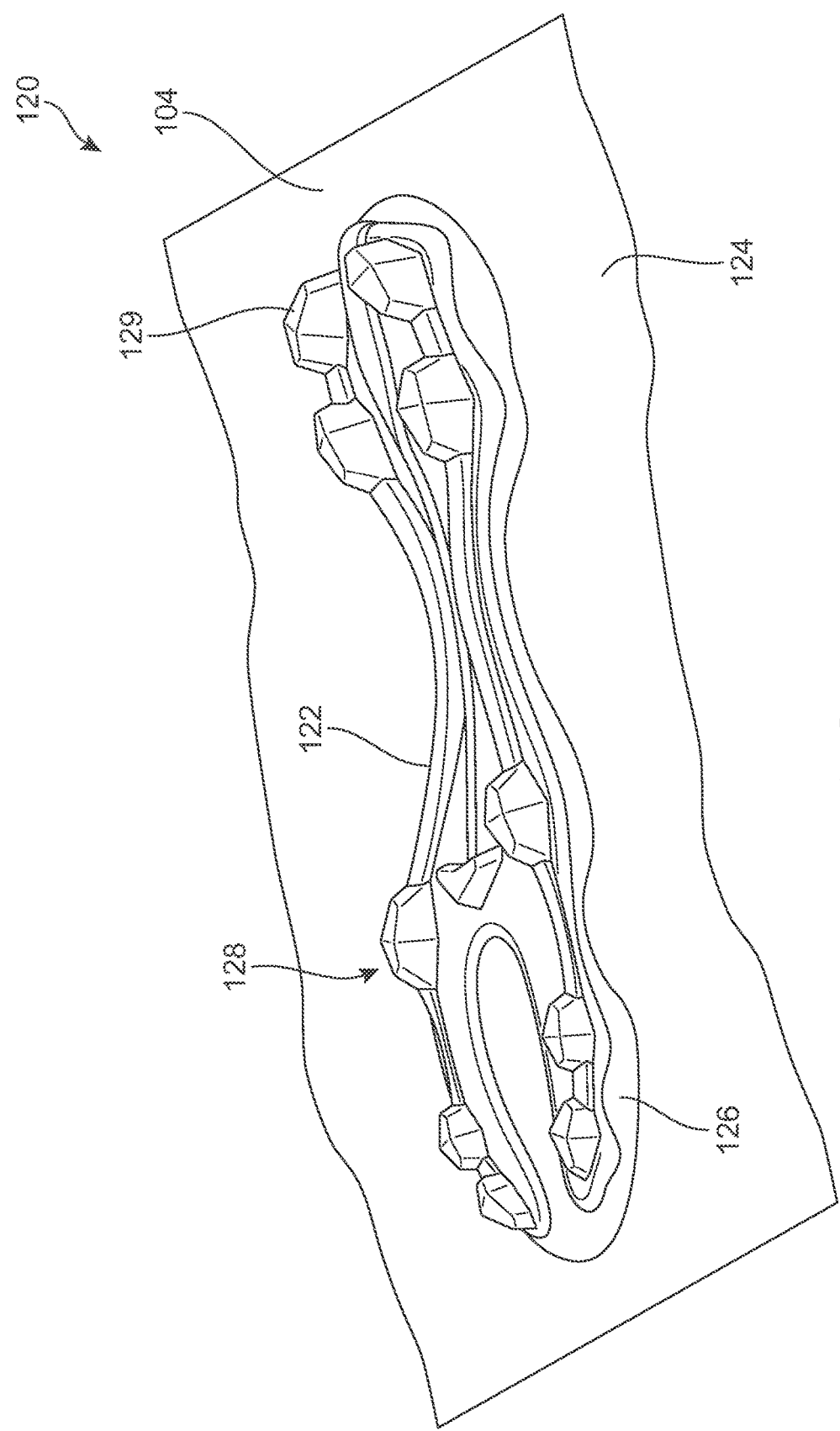
FIG. 3 is an isometric view of an embodiment a plate member of a sole plate assembly, in an initial stage of being formed.

FIG. 3 is a perspective view of an embodiment a plate member of a sole plate assembly, in an initial stage of being formed. In one embodiment, plate member 120 may be made by the embodiments of the methods shown in FIGS. 1 and 2. After thermoforming, sheet 104 can be embodied by plate member 120 that can include a set impression 122 of mold 106. Plate member 120 may be provided with excess sheet material 124 formed around impression 122 of mold 106. After thermoforming, sheet 104 may include a molded portion 126 surrounded by excess sheet material 124 that may later be removed. FIG. 3 illustrates excess sheet material 124 prior to being removed from molded portion 126.

Figure 4:
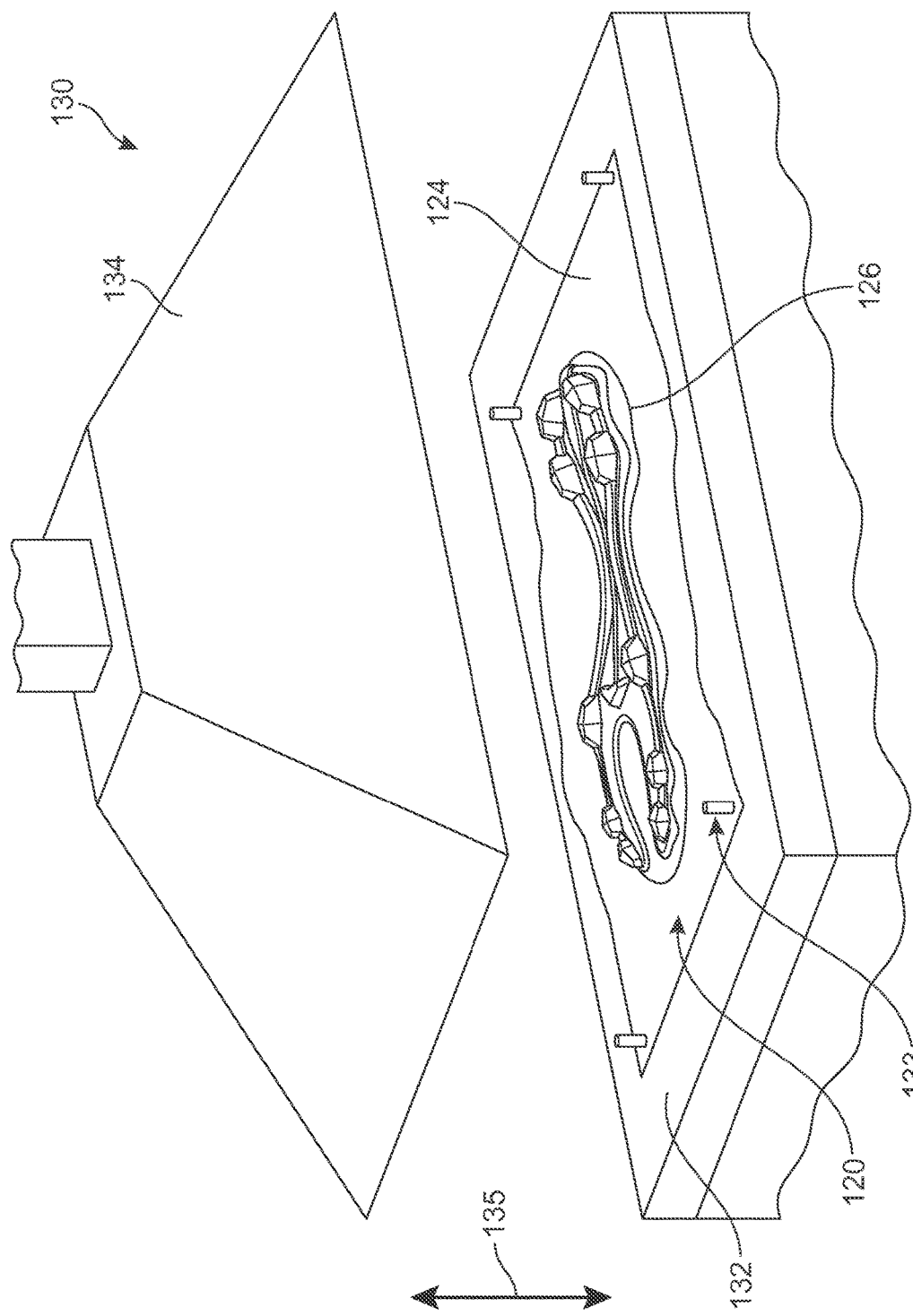
FIG. 4 is an isometric view of an embodiment of a cutting system, for a step of removing excess sheet material from an embodiment of an initial plate member shown in FIG. 3.

FIG. 4 shows an embodiment of a step for removing excess sheet material 124 from molded portion 126. In some embodiments, some portions or all portions of excess sheet material 124 may be cut away from molded portion 126. In one embodiment, excess sheet material 124 may be removed from molded portion 126 using a die cutter 130, for example. Die cutter 130 is shown in illustrative form, as an exemplary embodiment. It will be understood that any mechanism or method may be employed to remove excess sheet material 124 from molded portion 126 of plate member 120. In some embodiments, cutting, machining, punching, water jet, or laser methods, for example, may be used to remove excess sheet material 124 from molded portion 126 of plate member 120.

In one embodiment, a step of removing excess sheet material 124 can include a step of securely positioning plate member 120 onto a cutting surface 132. In one embodiment, provisions can be provided to securely position plate member 120 onto cutting surface 132. In an exemplary embodiment, plate member 120 may be aligned and secured on cutting surface 132 by alignment members 133. In an exemplary embodiment, alignment members 133 may be exemplified by pins. It will be understood that any suitable means to secure and align plate member 120 to cutting surface 132 may be employed.

Additionally, cutting die 134 (not shown in detail) may be configured to correspond to molded portion 126 of plate member 120. Furthermore, cutting die 134 may be lowered onto plate member 120 on cutting surface 132, thereby cutting excess sheet material 124 from molded portion 126. Cutting die 134 may then be raised from cutting surface 132 to reveal cut plate member 120. Thus, cutting die 134 may translate in a generally vertical direction over cutting surface 134, which is indicated schematically by arrow 135, for simplicity.

In one embodiment, plate member 120 may be made by the embodiments of methods shown in FIGS. 1 through 4. In some embodiments, plate member 120 may be formed as an impression 122 of mold 106. In an exemplary embodiment, mold 106 may be in the form of the bottom of a sole structure. Particularly, the plate member 120 may be an outer shell formed by thermoforming a foil material, as described above. In an exemplary embodiment, the outer shell may be a ground-contacting outer shell, to be further described below.

Figure 5:
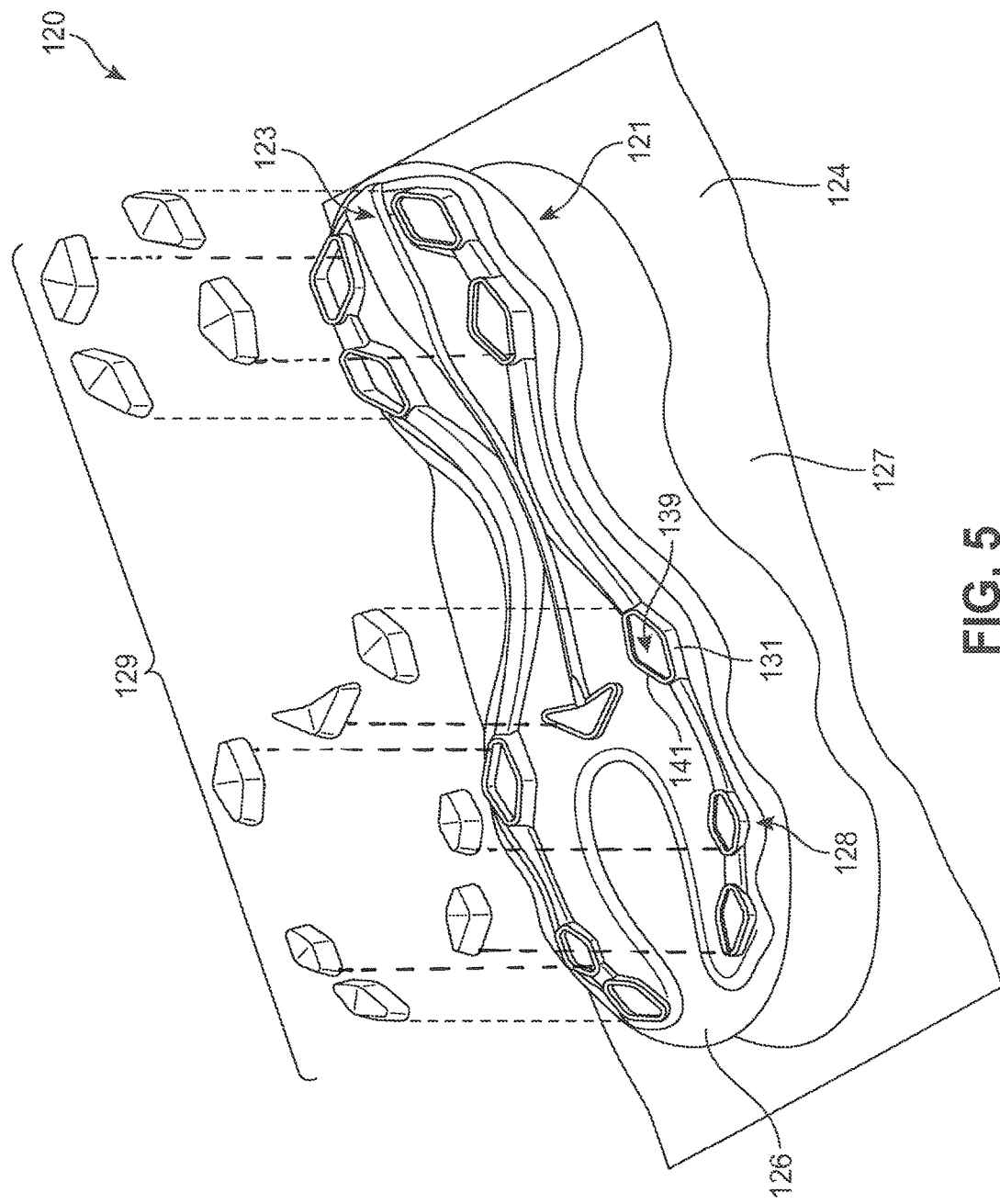
FIG. 5 shows an isometric exploded view of an embodiment of molded plate member having excess sheet material removed.

FIG. 5 shows an exploded view of an embodiment of plate member 120 having excess sheet material 124 removed. The portions of excess sheet material 124 that have been cut away from the molded portion 126 are also shown. A sheet portion 127 of excess sheet material 124 is shown having a cut-out shape corresponding to molded portion 126.

In embodiments shown in FIGS. 1 through 5, a bottom of the plate member 120 may be formed with one or a plurality of protruding portions 128, enumerated in FIGS. 3 and 5. One or more protruding portions 128 may be included in plate member 120 in any region of plate member 120. In some embodiments, a forefoot region, a midfoot region, and/or a heel region of plate member 120 may include one or more protruding portions 128. In some embodiments protruding portions 128 can be included in a ground-contacting outer shell embodied by plate member 120.

In some embodiments, mold 106 may include provisions to form protruding portions 128 on plate member 120. In one embodiment, mold 106 may include one or more protrusions 108 to form one or more protruding portions 128. In an exemplary embodiment shown in FIG. 1, mold 106 may include a plurality of protrusions 108. In an exemplary embodiment, the plurality of protrusions 108 may be arranged at various areas of mold 106 to form plate member 120 with protruding portions 128 disposed at corresponding locations. In such an embodiment, exemplary mold 106 can include a plurality of protrusions 108 located at areas corresponding to a forefoot region and a heel region. In other embodiments, mold 106 may include different numbers of protrusions 108 arranged at various locations.

As seen in FIG. 5, the ends of protruding portions 128 may be open. As an example, a first protruding portion 131 of protruding portions 128 includes an opening 139 that is bounded by a periphery 141. Opening 139 may provide fluid communication between a top side 121 (see also FIG. 6) and a bottom side 123 of plate member 120. In a similar manner, each of the remaining protruding portions of the set of protruding portions 128 may have a substantially similar open geometry. In other embodiments, however, protruding portions 128 can be closed. Such a closed configuration for protruding portions 128 can be seen in FIG. 3, which illustrates plate member 120 before openings have been formed in protruding portions 128.

Openings in one or more protruding portions 128 can be achieved using different methods during the formation of plate member 120. In some embodiments, the tips of protruding portions 128 could be removed following the molding of plate member 120. Such a configuration is illustrated in FIG. 5, in which the distal ends 129 of protruding portions 128 have been removed. This may be achieved in some cases using cutting methods. In some embodiments, for example, distal ends 129 may be cut from protruding portions 128 using a cutting die. In other embodiments, other methods of cutting distal ends 129 from protruding portions 128 could be used.

Of course it will be understood that features of protruding portions 128 can vary from one embodiment to another. For example, different embodiments can utilize various numbers and/or configurations of protruding portions 128. In the illustrated embodiments, plate member 120 includes seven protruding portions in a forefoot region and four protruding portions in a heel portion. However, other embodiments could accommodate any other number, pattern and/or arrangement of protruding portions on plate member 120. Furthermore, although the exemplary geometry of protruding portions 128 is approximately diamond-shaped, other embodiments could incorporate protruding portions having any other geometric shapes.

Figure 6:
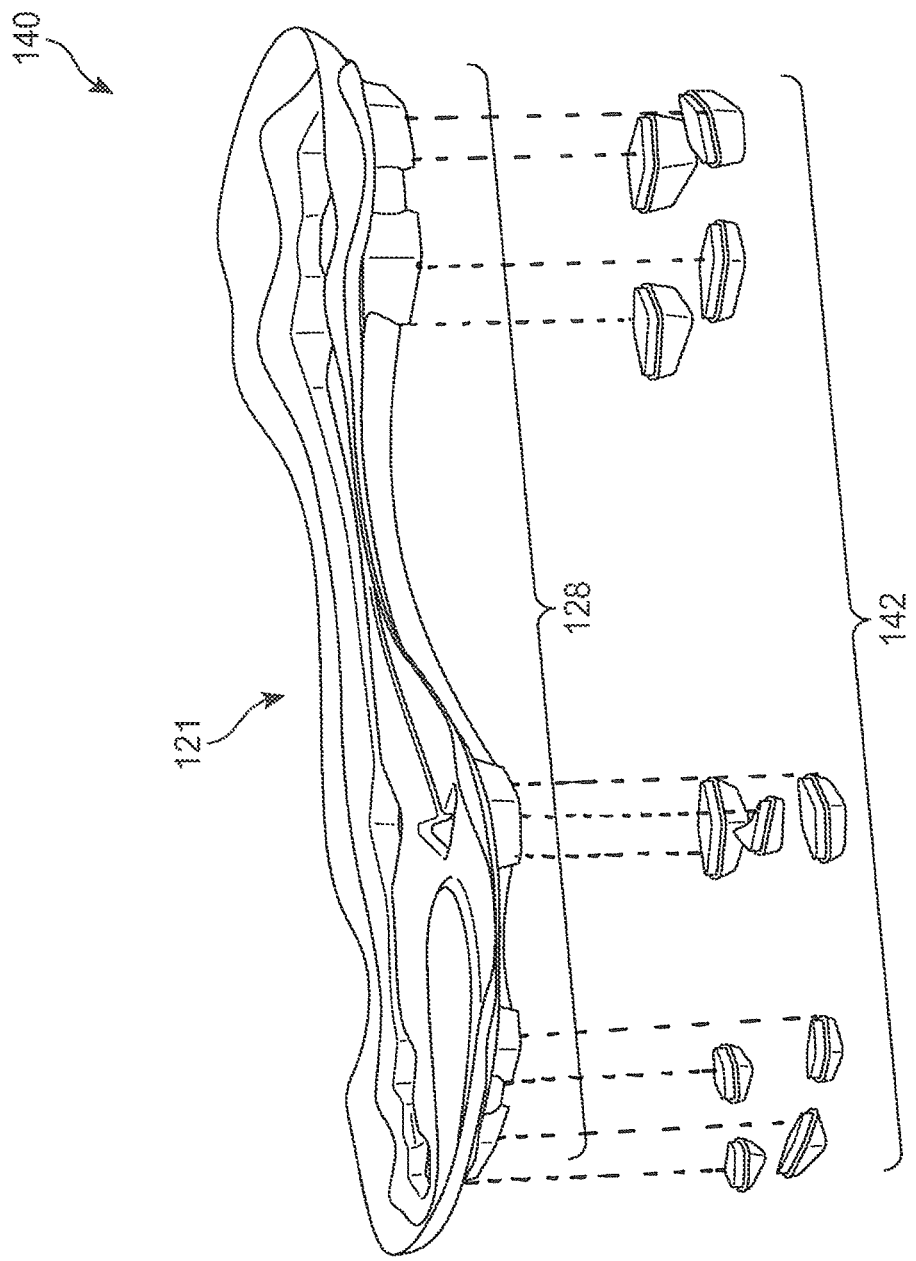
FIG. 6 is an isometric exploded view of an embodiment of a molded plate member and cleat members.

Plate member 120, after being formed and cut, is referred to hereinafter as outer shell 140. In FIG. 6, an embodiment of outer shell 140 is shown in an inverted view as compared to FIG. 5. In one embodiment, outer shell 140 may be made by embodiments of methods shown in FIGS. 1 through 5. In addition, in some embodiments, a sole plate assembly may include one or a plurality of elements 142, such as illustrated in FIG. 6. In an exemplary embodiment, the elements 142 may include cleat members or portions of cleat members that may be pre-formed by known methods. In such embodiments, pre-formed cleat members may be pre-manufactured, meaning that the cleat members or portions of cleat members have already been made by injection molding or other methods, for example.

In some embodiments, elements 142 may be embodied by one or more ground contacting cleat members (or portions of cleat members) that are configured to engage, and partially insert into, a ground surface. Elements 142 may be further divided into forefoot cleat members and heel cleat members. The embodiments shown in the figures show an exemplary configuration for forefoot and heel cleat members. In other embodiments, however, the configuration of cleat members could vary and could be selected according to desired traction properties in forefoot portion and heel portion, for example. Moreover, the number of cleat members could also vary to achieve various traction characteristics.

In an exemplary embodiment, outer shell 140 and elements 142 are shown in a spaced relation prior to a step of positioning outer shell 140 and elements 142 in an injection mold. In some embodiments, elements 142 may be omitted. In such embodiments, portions of distal ends 129 of protruding portions 128 may or may not be removed from outer shell 140.

Referring now to FIGS. 7 through 12, embodiments of an injection molding system 150 for forming an additional component onto outer shell 140 of a sole plate assembly are illustrated. In an exemplary embodiment, a sole plate assembly may further include a structural component formed by injection molding a plastic material onto a thermoformed foil member which can be embodied by outer shell 140.

Figure 7:
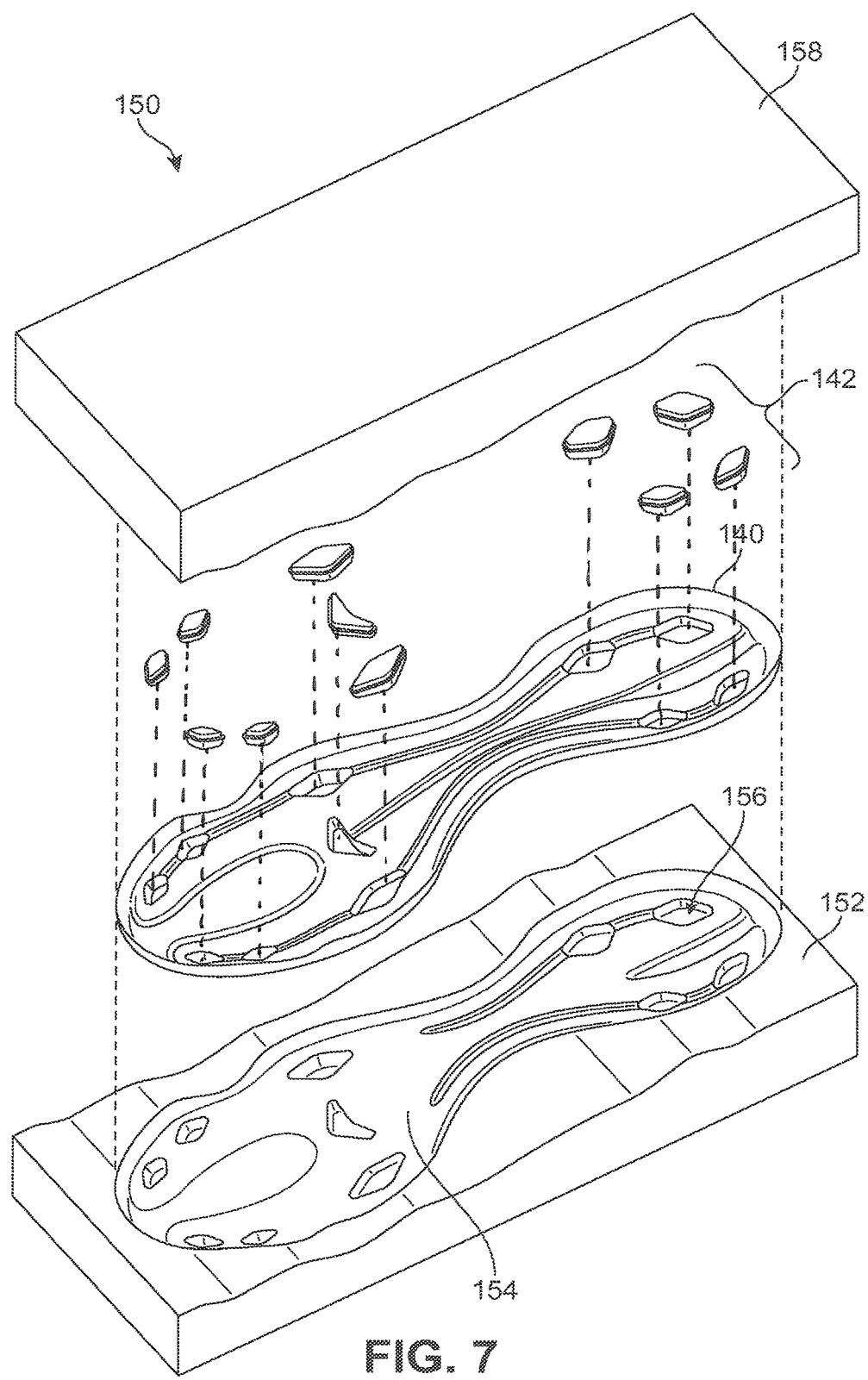
FIG. 7 is an isometric exploded view of an exemplary embodiment of an injection molding system for forming an exemplary component of a sole plate assembly.

FIG. 7 illustrates a schematic view of an exemplary embodiment of an injection molding system 150 for molding a structural component onto outer shell 140. In some embodiments, injection molding system 150 may include one or more components typically associated with an injection mold, including components not described herein. Methods of molding and molding systems which may be included in some aspects of some embodiments of the present application are disclosed in Gerber, U.S. Pat. No. 8,945,449 issued Feb. 3, 2015, and entitled "METHOD FOR MAKING A CLEATED PLATE," the entirety of which is hereby incorporated by reference.

In some embodiments, injection molding system 150 may include a bottom mold 152. In an exemplary embodiment, bottom mold 152 may include one or more cavities 154 that may be sized and dimensioned so as to correspond to an exterior shape associated with exemplary outer shell 140, such as described above. In some embodiments, cavity 154 of bottom mold 152 can receive both outer shell 140 and elements 142. In such embodiments, outer shell 140 may be inserted into cavity 154 first and elements 142 may be inserted into cavity 154 second. Alternatively, elements 142 can be inserted into cavity 154 first and outer shell 140 may be inserted into cavity 154 second. In some embodiments, elements 142 may or may not be inserted into cavity 154 of bottom mold 152. In an exemplary embodiment illustrated in FIG. 7, outer shell 140 may be inserted into cavity 154 of bottom mold 152 prior to elements 142.

In some embodiments, cavity 154 may include one or more receptacles 156, which may be formed as recesses in bottom mold 152. Receptacles 156 may be configured to receive protruding portions 128 of outer shell 140. In an exemplary embodiment, receptacles 156 may be configured to receive protruding portions 128 (see FIG. 6) and/or elements 142 which may include cleat members described above. Additionally, receptacles 156 can be sized and dimensioned so as to hold elements 142 in place within cavity 154 and to receive protruding portions 128. In an exemplary embodiment, the plurality of receptacles 156 may be arranged at various portions of cavity 154 to form a sole plate assembly with cleat members disposed at corresponding locations.

In some embodiments, injection molding system 150 may include an upper mold 158 configured to align over bottom mold 152. In some embodiments, upper mold 158 may include at least one upper mold surface 159, which may correspond to a number of cavities 154 disposed in bottom mold 152. In an exemplary embodiment shown in FIGS. 7 and 8, upper mold 158 is illustrated as having one upper mold surface 159 to correspond to the one cavity 154 of bottom mold 152, for simplicity.

Upper mold surface 159 may be configured so as to form an upper surface of a structural component 160 (FIG. 13) to be injection molded onto outer shell 140. In some embodiments, upper mold surface 159 may include concave portions and/or convex portions to form a desired upper surface of structural component 160. Additionally, upper mold surface 159 may include protrusions and/or recesses (not shown in detail) on the concave portions and/or convex portions to form corresponding indentations and/or raised portions on the upper surface of the structural component.

In some embodiments, the structural component may be formed as an element of a midsole. In such cases, an upper surface of the structural component may be formed to conform to a wearer's foot, for example. In other embodiments, the structural component may be embodied by other parts of a sole structure, such as additional layers, reinforcing elements, and/or decorative elements, for example Referring now to FIG. 8, a partial cut-away view of an exemplary embodiment of injection molding system 150 is illustrated. Structural component 160 may be molded onto outer shell 140 using injection molding system 150, for example. In this case, outer shell 140 may be placed into bottom mold 152, and filled with a molding material 162. In some embodiments injection molding system 150 may include components configured to introduce molding material 162 into cavity 154. In an exemplary embodiment, injection molding system 150 may include upper mold 158. In some embodiments, upper mold 158 may include one or more injection ports, such as injection port 166 and injection port 168 configured to introduce molding material 162 into cavity 154. In one embodiment, one injection port 166 can be provided in a general area corresponding to a forefoot portion of mold, and injection port 168 can be provided in a general area corresponding to a heel portion of mold. In other embodiments, more or fewer injection ports may be provided in other areas of one or both of upper mold 158 and bottom mold 152.

Figure 8:
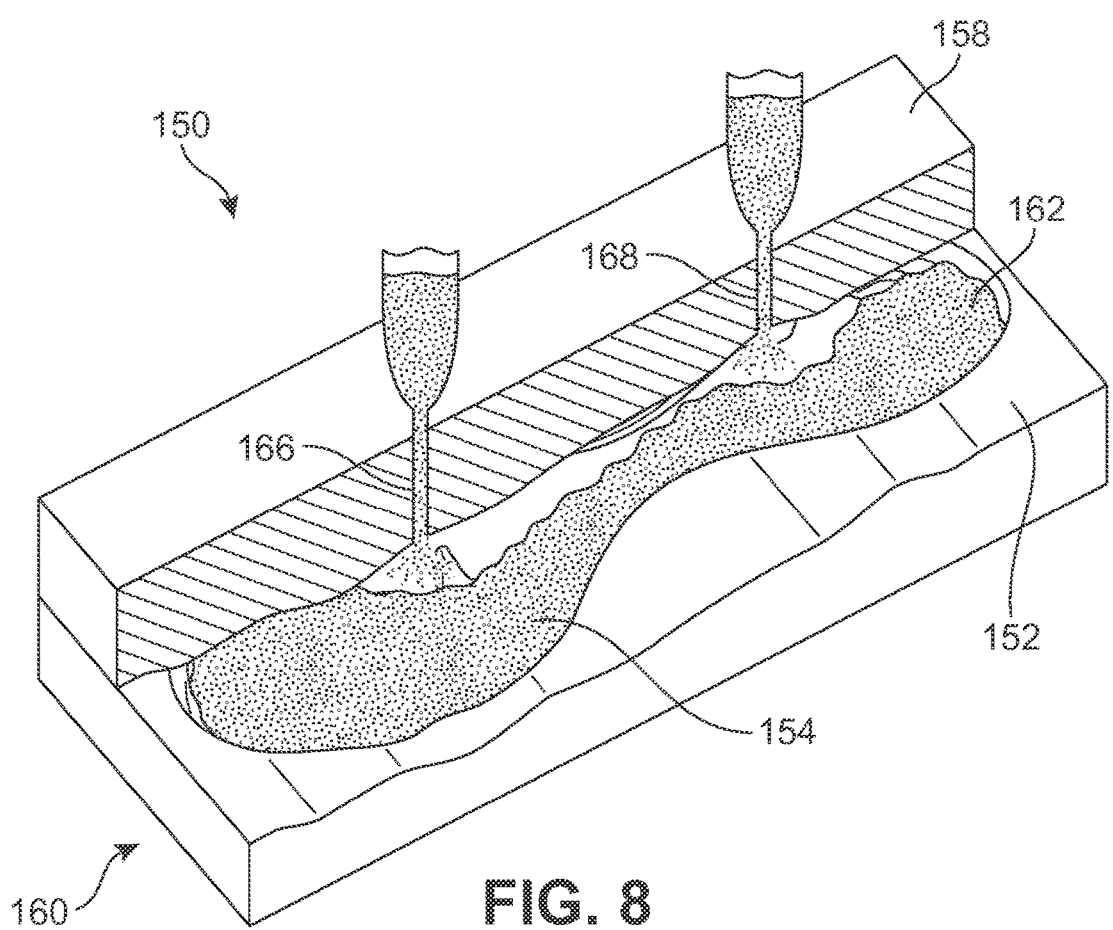
FIG. 8 shows an isometric partial cut-away view of an exemplary embodiment of an injection molding system, according to one embodiment.

As shown in FIG. 8, molding material 162 may be introduced into injection molding system 150 through one or both of injection port 166 and injection port 168. As shown in the cut-away view, in this embodiment, molding material 162 can be injected through upper mold 158 into bottom mold 152 to fill cavity 154 to form structural component 160.

Referring now to FIGS. 9 through 12, an embodiment of a method of forming structural component 160 onto outer shell 140 is shown in several steps. A lengthwise cross-sectional view of an embodiment of molding system 150 of FIG. 8 is represented in FIGS. 9 through 12, shown in illustrative form (not to scale).

Figure 9:
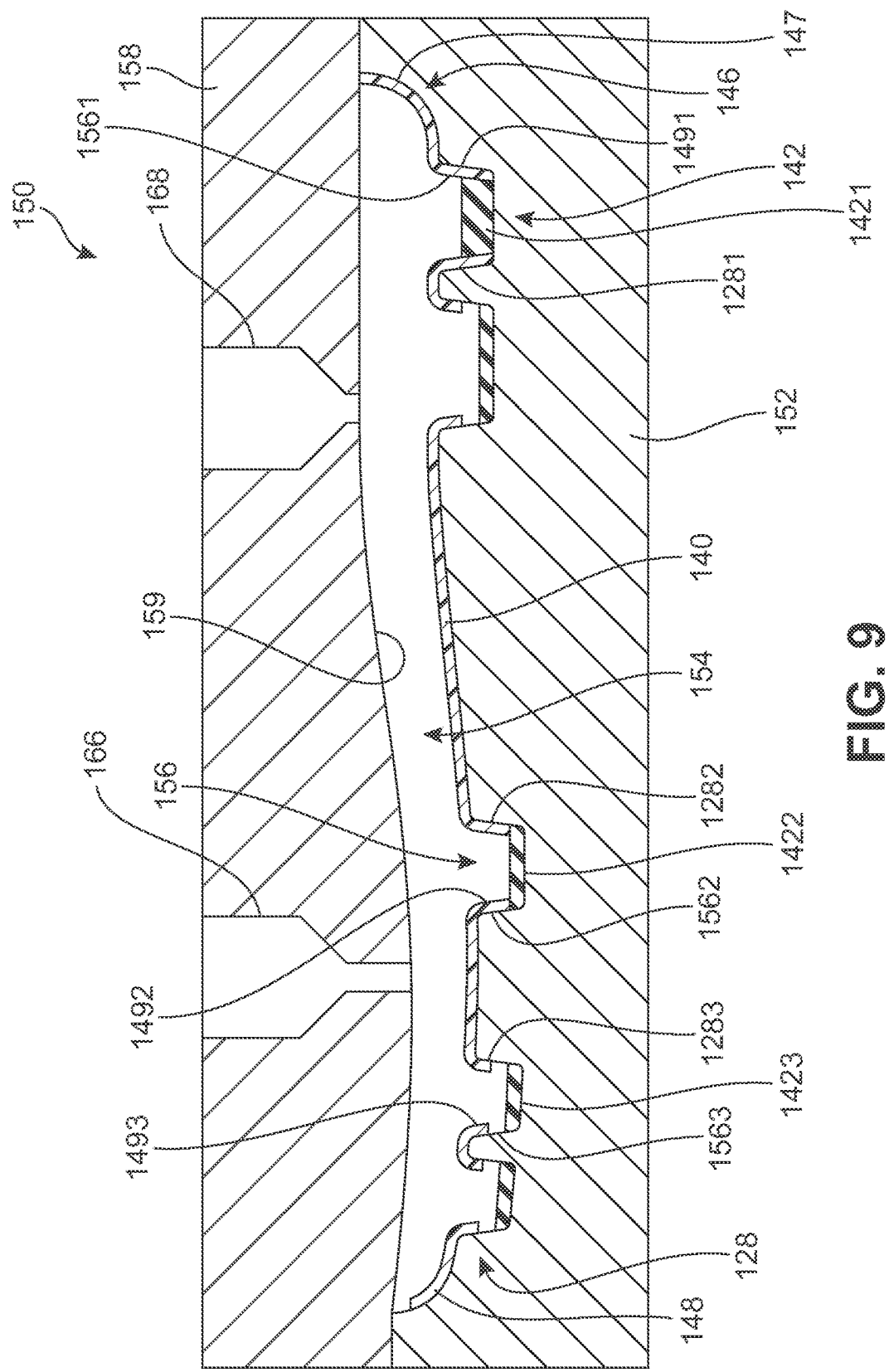
FIG. 9 is an schematic cross-sectional view illustrating an embodiment of a method of forming a structural component in an initial step, according to one embodiment.

In an exemplary embodiment shown in FIG. 9, prior to injecting molding material 162, outer shell 140 and elements 142 may be positioned in cavity 154 of bottom mold 152. In such cases, one or more of receptacles 156 may receive elements 142 prior to introducing molding material 162 into cavity 154. In some embodiments, elements 142 may or may not be inserted into bottom mold 152.

It can be seen in FIG. 9 that an outer shell wall 146 may at least partially extend from a bottom area of cavity 154 toward upper mold surface 159. In one embodiment, outer shell wall 146 may extend completely from the bottom area of cavity 154 to upper mold surface 159. For example, one portion 147 of outer shell wall 146, which may be located generally in a heel region of outer shell 140, may extend upward so as to come into contact with upper mold surface 159. Meanwhile, another portion 148 of outer shell wall 146, which may be located generally in a forefoot region of outer shell 140, may extend only partially upward and may not come into contact with upper mold surface 159. In other embodiments, different portions of peripheral edge of outer shell wall 146, other than those exemplified above, may come extend upward to contact with upper mold surface 159.

In some embodiments, protruding portions 128 of outer shell 140, which may or may not have distal ends 129 removed, can be provided with walls that may or may not extend completely to bottom of receptacles 156. In an exemplary embodiment, the distal ends 129 may be removed from the protruding portions 128 of outer shell 140. In one such an embodiment shown in FIG. 9, wall 1491 of protruding portion 1281 (one of protruding portions 128) extends to the bottom of receptacle 1561 (one of receptacles 156). Furthermore, in that example, element 1421 (one of elements 142) may be at least partially encompassed by wall 1491.

In another embodiment also shown in FIG. 9, in which elements 142 also may be positioned in receptacles 156, wall 1492 of protruding portion 1282 (one of protruding portions 128), for example may extend far enough into receptacle 1562 (one of receptacles 156) to be flush against element 1422 (one of elements 142).

In yet another embodiment, in which elements 142 may be positioned in receptacles 156, wall 1493 of protruding portion 1283 (one of protruding portions 128), may be spaced apart from element 1423 (one of elements 142), as exemplified in receptacle 1563 (one of receptacles 156), in FIG. 9. In such an example a portion of the element 1423 may become interlocked with protruding portion 1283 by molding material 162 injected into the cavity 154, to be described hereinafter. In such an exemplary embodiment the upper surface of element 1423 may be connected to protruding portion wall 1493 by the molded material forming structural component 160 therebetween.

Figure 10:
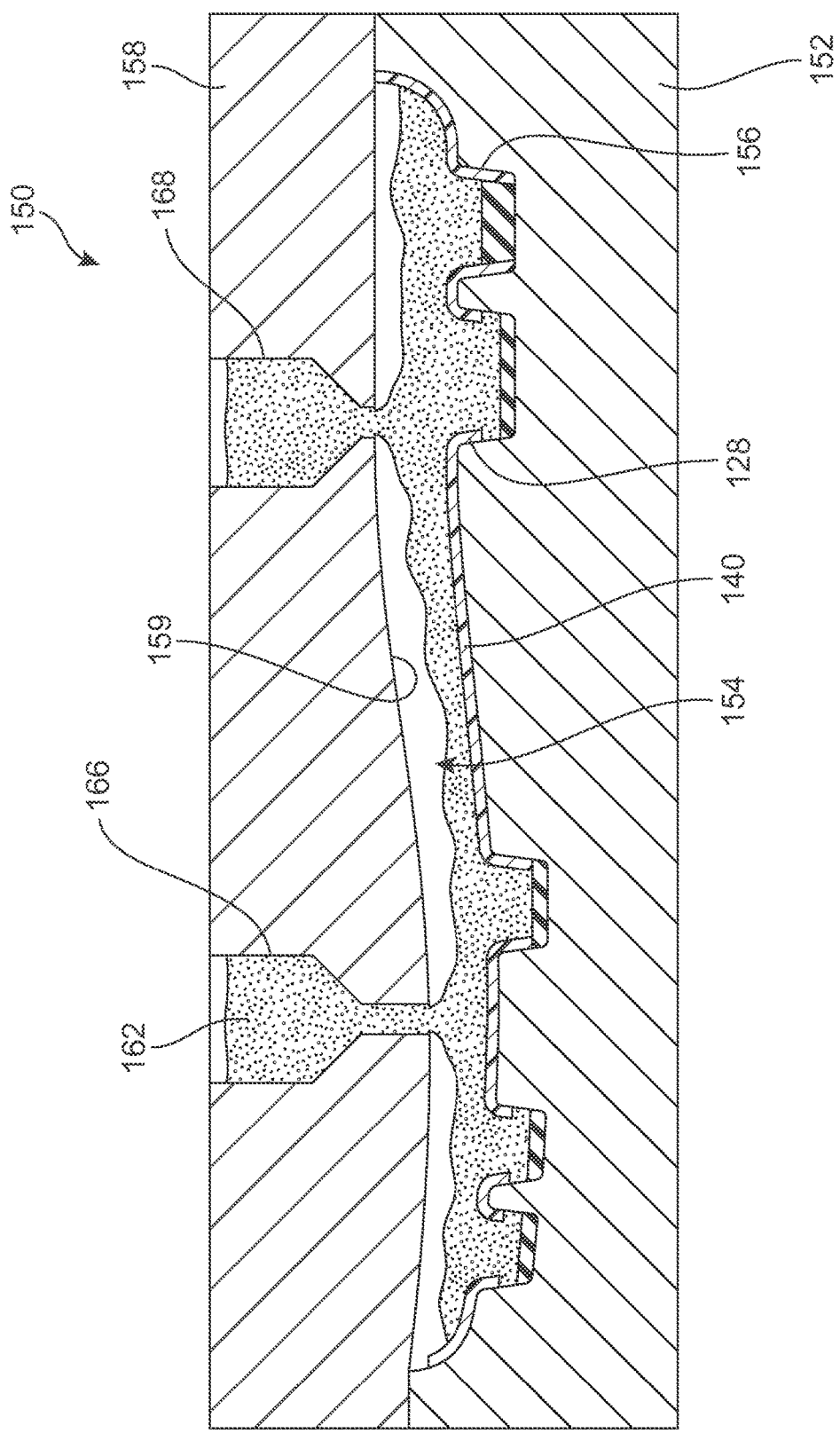
FIG. 10 is an schematic cross-sectional view illustrating an embodiment of a method of forming a structural component in another step, according to one embodiment.

FIG. 10 shows an embodiment of a next step of injecting molding material 162 into cavity 154 over outer shell 140 and elements 142. Injected material 162 may be injected thought injection port 166 and/or injection port 168 which may both be disposed in upper mold 158, for example. The cavity 154 can be filled partially such that the receptacles 156 in bottom mold 152 become filled with injection material 162. Additionally the bottom portion of outer shell 140 is depicted as being partially filled with injection material 162. In an exemplary embodiment, molding material 162 may completely cover the plurality of elements 142 disposed within receptacles 156.

Figure 11:
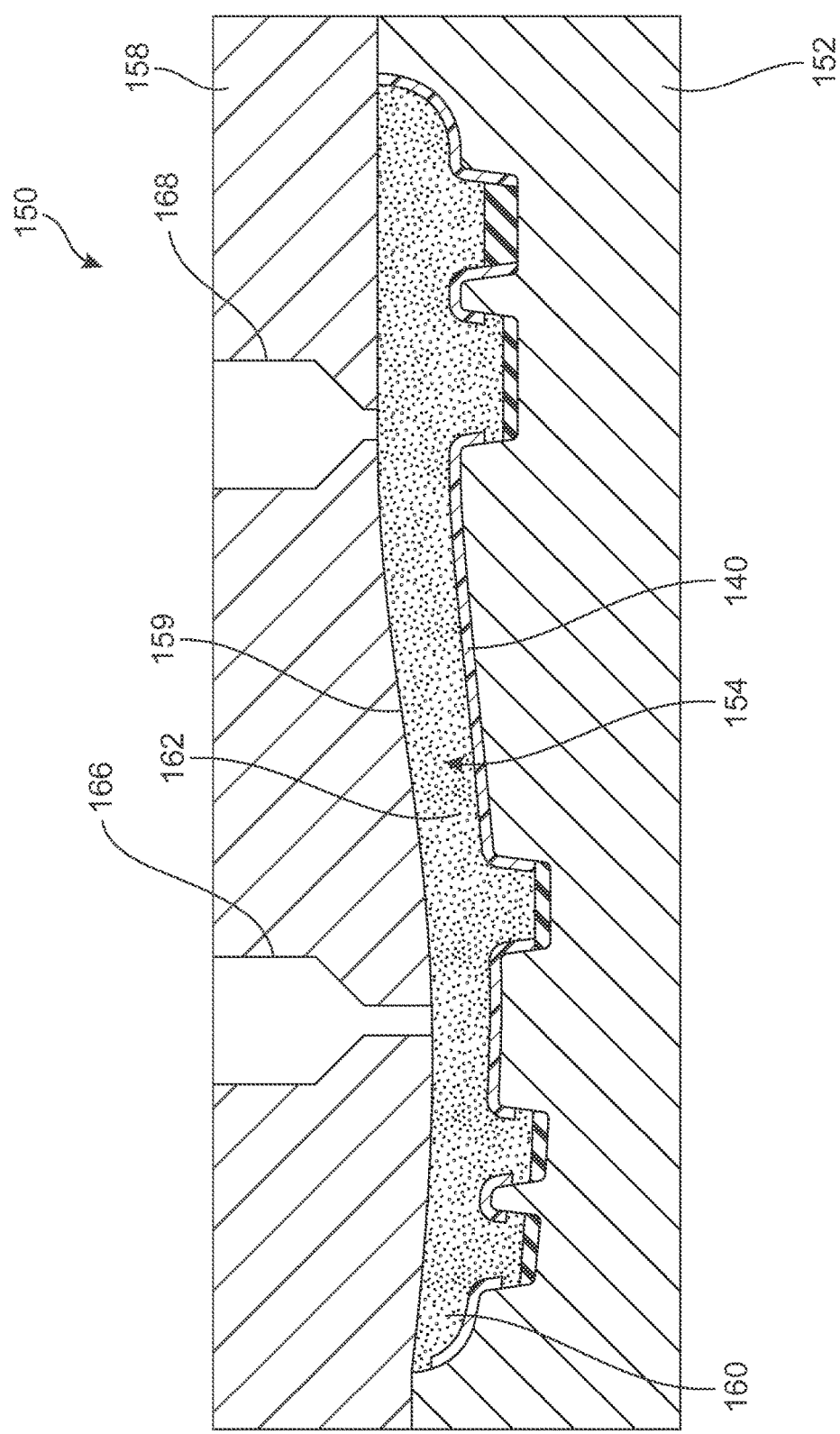
FIG. 11 is an schematic cross-sectional view illustrating an embodiment of a method of forming a structural component in a further step, according to one embodiment.

FIG. 11 shows an embodiment of a further step of injecting molding material 162 into cavity 154 over outer shell 140 and elements 142. In this step cavity 154 may be completely filled with injection material 162. The molding material 162 may come into contact with upper mold surface 159 to form an upper surface of injected structural component 160. Injection port 166 and injection port 168 are shown as empty to indicate that the step of injecting molding material 162 is complete. It will be understood that the cross-sectional views of FIGS. 9 through 12 have been simplified and are intended to illustrate embodiments of the steps of forming structural component 160.

Figure 12:
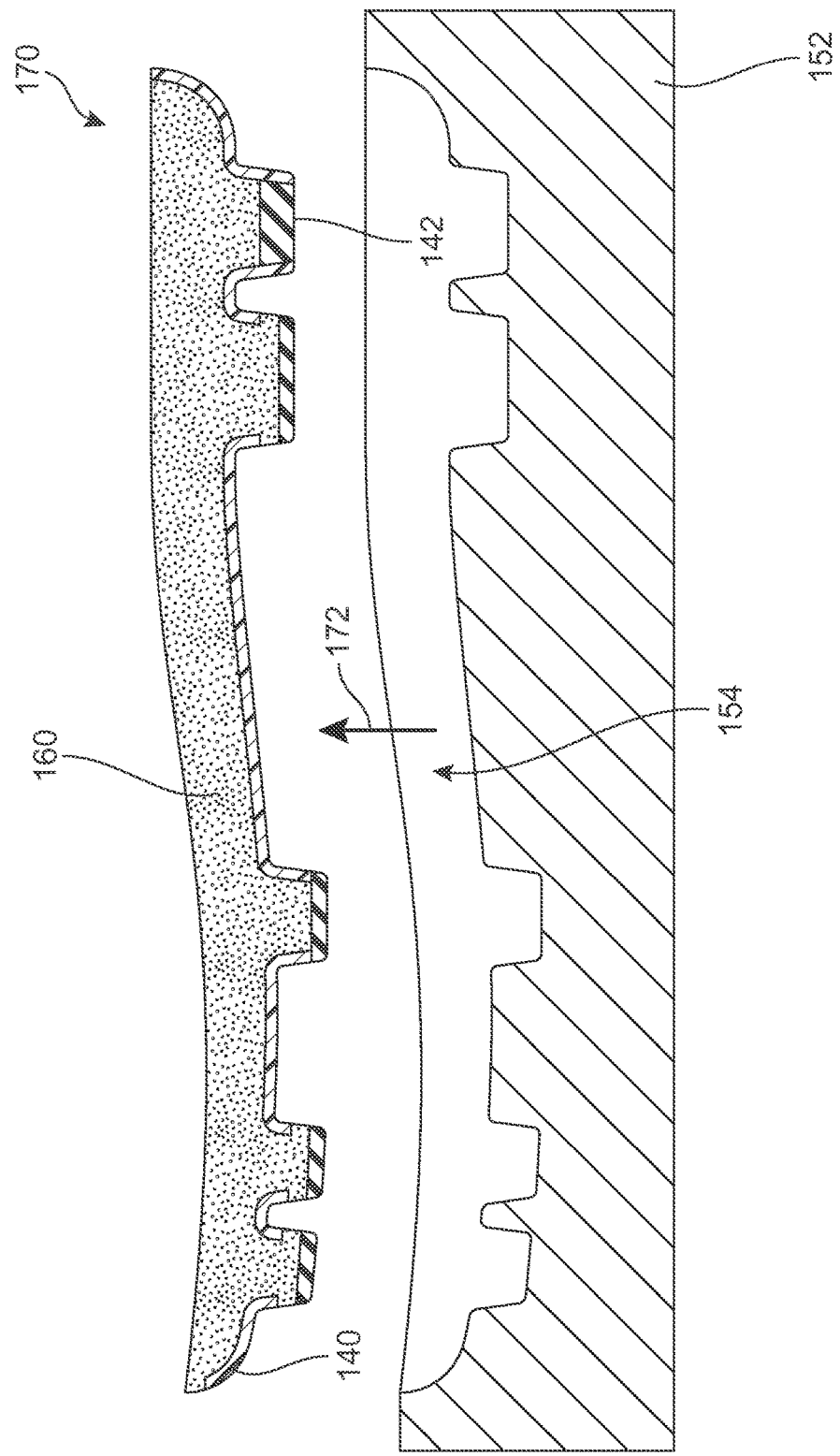
FIG. 12 is an schematic cross-sectional view illustrating an embodiment of a method of forming a structural component in a later step, according to one embodiment.

FIG. 12 illustrates an embodiment of a step of removing an assembled sole plate assembly 170 from bottom mold 152. In one embodiment, sole plate assembly 170 may be removed from bottom mold as indicated by arrow 172. In an exemplary embodiment, sole plate assembly 170, embodied as an element of a sole structure for an article of footwear, includes outer shell 140 made from thermoformed foil material. Additionally, such an exemplary embodiment may include structural component 160 injection molded to outer shell 140. Further, such an exemplary embodiment may include pre-formed cleat tips, such as those formed by elements 142.

Figure 13:
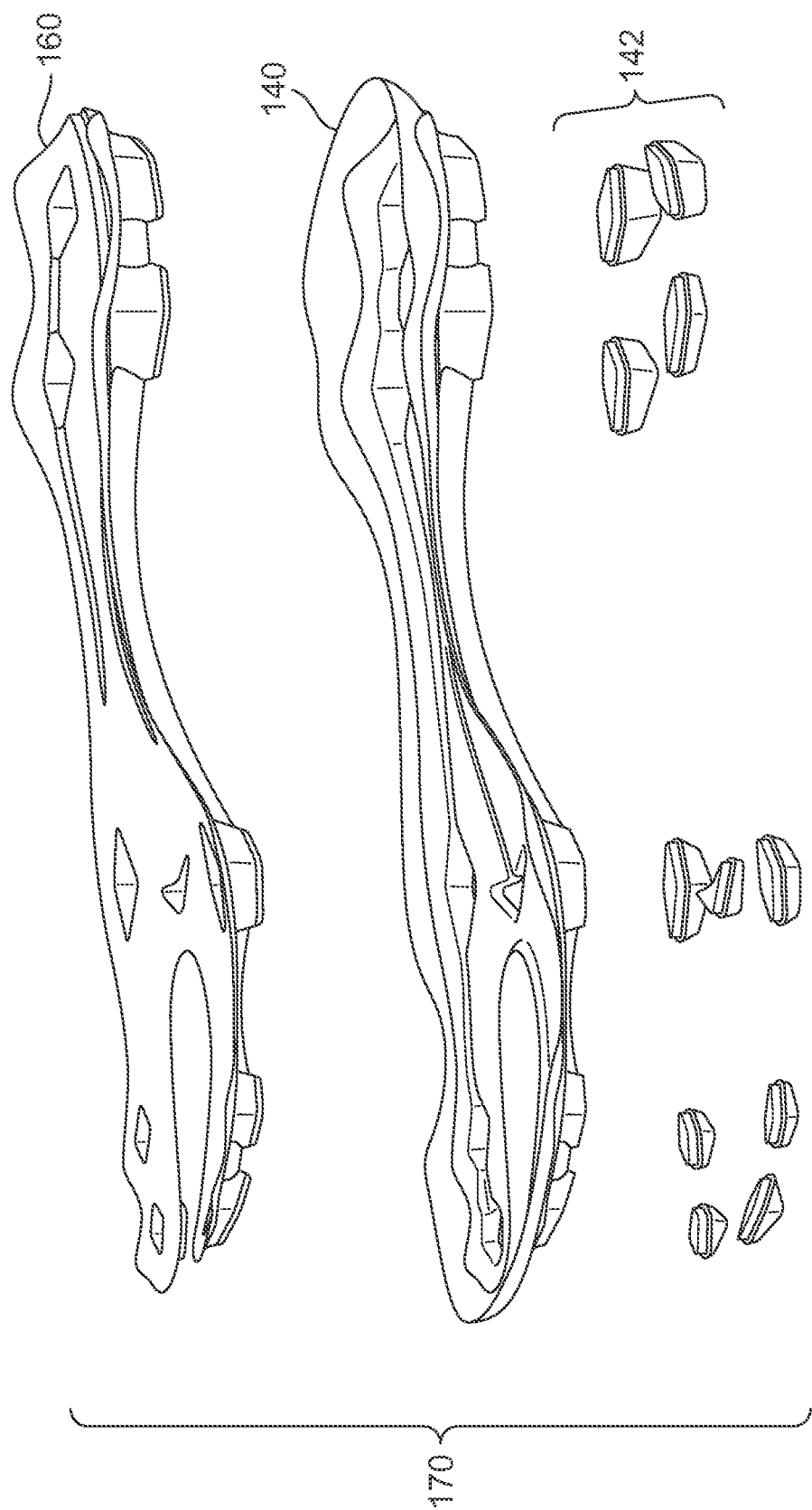
FIG. 13 shows an isometric exploded view of an embodiment of the components of an exemplary sole plate assembly.

In FIG. 13, an exploded view of an embodiment of components of an exemplary sole plate assembly 170 is illustrated. In one embodiment, the components of sole plate assembly 170 may include structural component 160, outer shell 140, and one or a plurality of elements 142 such as cleat members. Structural component 160 can be made by embodiments of the methods shown in FIGS. 6 through 12. Structural component 160 can be embodied as the injected part formed onto outer shell 140 and elements 142. In an exemplary embodiment, structural component 160, outer shell 140, and elements 142 are shown in a spaced relation for clarity. However, following a step of injection molding of structural component 160 onto outer shell 140, the components of sole plate assembly 170 may be bonded together.

Figure 14:
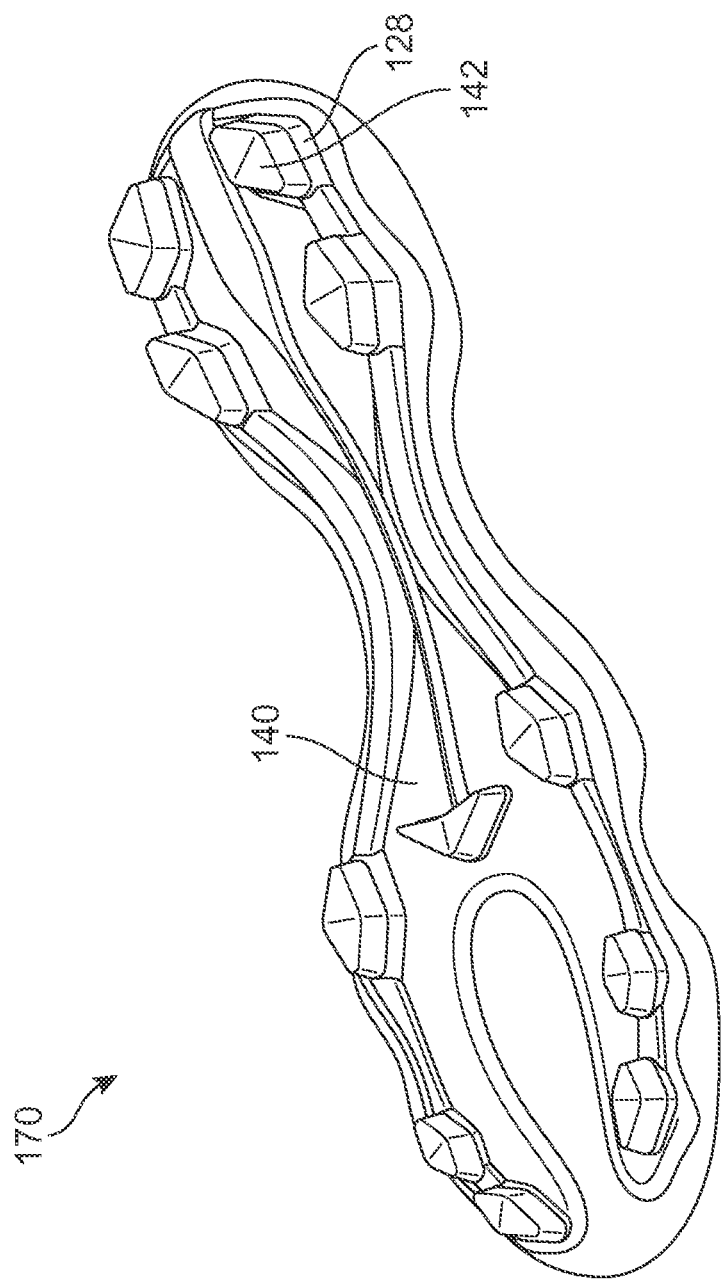
FIG. 14 is an isometric view of an exemplary embodiment of a sole plate assembly, according to one embodiment.

Referring also now to FIG. 14, an isometric view of an exemplary embodiment of sole plate assembly 170 that may be formed using injection molding system 150 is illustrated. In some embodiments, sole plate assembly 170 may be formed using injection molding system 150, as described above. In an exemplary embodiment, sole plate assembly 170 may include a plurality of elements 142, which extend distally from protruding portions 128. Sole plate assembly 170 may have a layered construction of outer shell 140, upper structural component 160 disposed essentially on an upper side of outer shell 140, and elements 142 disposed essentially on an underside of outer shell 140. Molding material 162, which forms structural component, has adhesive properties which adheres to outer shell 140 and elements 142, thereby bonding the layers of sole plate assembly 170. It will be understood that additionally adhesives may be applied to outer shell 140 and elements 142 to further strengthen bonds between components, for example prior to injection molding structural component 160.

Figure 15:
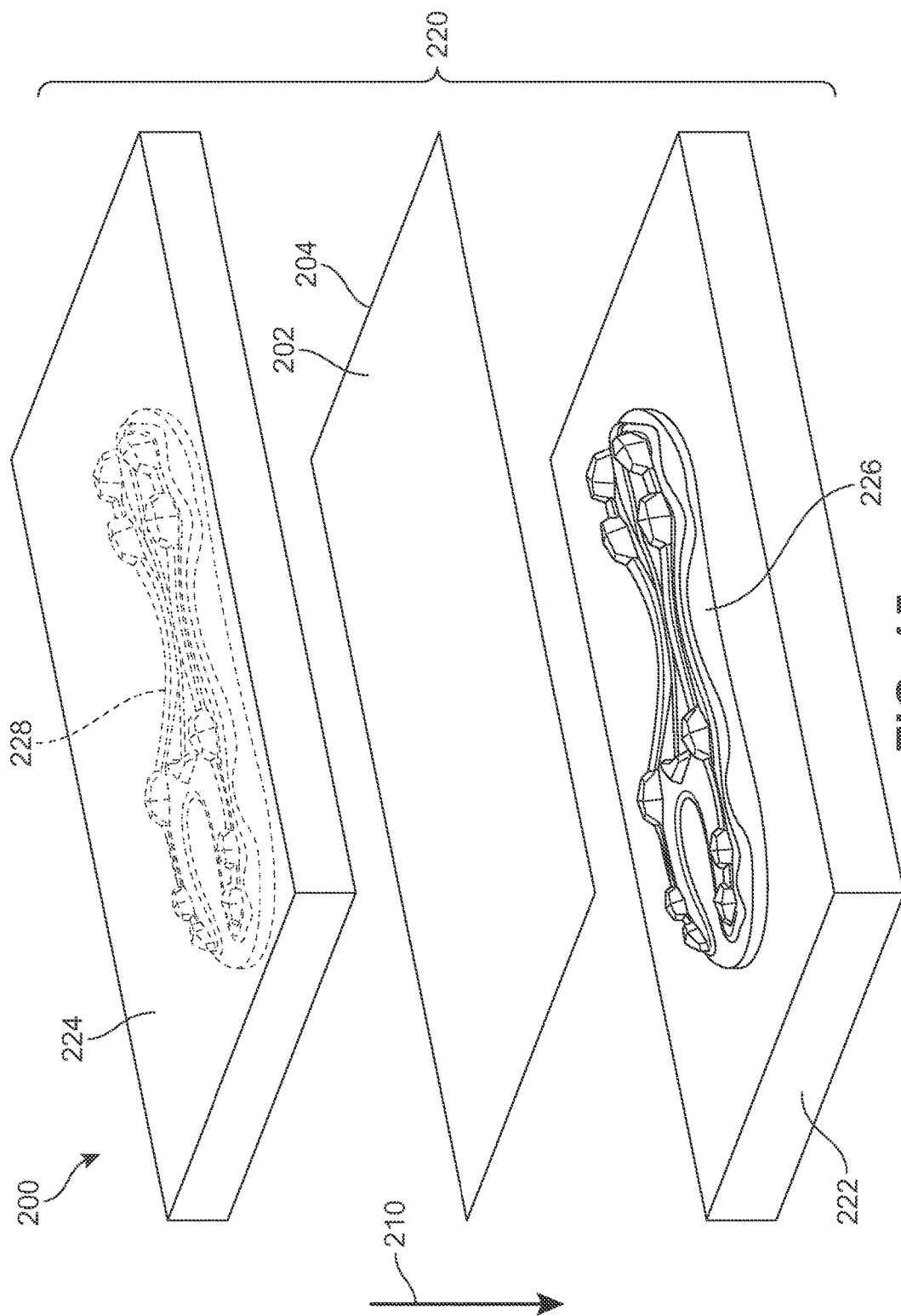
FIG. 15 is an isometric view showing an embodiment of a compression molding system for making an embodiment of a plate member of a sole plate assembly.

FIG. 15 is a perspective view showing an alternate embodiment of a compression molding system 200 for making a plate member of a sole plate assembly. In some embodiments, a foil material 202 may be used to form a plate member. In some embodiments, sheet 204 of foil material 202 initially has a planar configuration. Sheet 204 may be placed inside a thermoforming assembly 220 while in a planar configuration. For purposes of illustration, thermoforming assembly 220 is shown schematically as including a bottom mold 222 and a top mold 224, which include corresponding shaping portion 226 and shaping recess 228, respectively. By clamping top mold 224 and bottom mold 226 together with sheet 204 inserted between them, (not shown), the applied pressure in combination with heat may be used to reshape sheet 204 to form a thermoformed foil outer shell member, as previously described. Following this thermoforming process sheet 204 has acquired a non-planar or contoured geometry.

For purposes of clarity, the process for thermoforming sheet 204 is shown schematically and different embodiments may use different thermoforming techniques for reshaping sheet 204. Any of the various methods known in the art for thermoforming materials may be used. Moreover, the process of reshaping sheet 204 can be accomplished using other techniques known for shaping various kinds of fabrics, including synthetic materials.

The relative rigidities of each component of sole plate assembly 170 can vary in different embodiments. For purposes of discussion, the rigidity of structural component 160, outer shell 140 and elements 142 may be compared by discussing their relative rigidities. It should be understood that in some embodiments some components may have rigidities that vary by location, and therefore the relative rigidities discussed here are intended to describe differences between the average or representative rigidities of a component. Moreover, for purposes of clarity, each of elements 142 is characterized as having a substantially similar rigidity, though other embodiments may use varying rigidities for different cleat members according to location and/or function.

In some embodiments, outer shell 140 may have a greater rigidity than structural component 160 and elements 142. This arrangement allows outer shell 140 to provide the increased structural support for sole plate assembly 170. Moreover, this arrangement may allow for the use of more flexible materials for structural component 160 in order to accommodate various geometric constraints such as contours and sidewall portions, as well as to provide for an exterior appearance for sole plate assembly 170. Furthermore, using elements 142 that are less rigid than outer shell 140 may help provide improved grip and traction for sole plate assembly 170, as elements 142 may be capable of some deflection and bending when engaging a ground surface.

Exemplary materials for molding material 162 for structural component include, but are not limited to, rubbers, plastics, thermoplastics (such as thermoplastic polyurethane), as well as other materials. Exemplary materials for outer shell 140 include, but are not limited to, plastics, fiber reinforced composites, thermoplastics, various polymers, foams, metals, resins as well as any other kinds of materials. Exemplary materials for elements 142 may include, but are not limited to, rubbers, plastics, thermoplastics (such as thermoplastic polyurethane), as well as other materials. Moreover, it should be understood that each component could be constructed of more than a single material and may include any combination of the materials described above, as well as combinations with materials not mentioned here.

In an exemplary embodiment, the resulting sole plate assembly 170 made by an exemplary method and material, has the desired properties of being ultra-lightweight, and rigid yet flexible. At the same time, outer shell 140 which may be embodied as a thermoformed ground contacting outer shell has the desired traction and durability of an outsole of an article of footwear.

While various embodiments have been described, the description is intended to be exemplary, rather than limiting and it will be apparent to those of ordinary skill in the art that many more embodiments and implementations are possible. Accordingly, the embodiments are not to be restricted except in light of the attached claims and their equivalents. Also, various modifications and changes may be made within the scope of the attached claims.

What is claimed is:

1. An article of footwear having a sole structure, the sole structure comprising:
    an outer shell having a first protruding portion extending from a first ground-contacting surface of the outer shell and a second protruding portion extending from the first ground-contacting surface of the outer shell, the first ground-contacting surface extending continuously from a forefoot region of the sole structure to a heel region of the sole structure;
    a structural component disposed within the outer shell and extending into the first protruding portion and the second protruding portion;
    a first cleat member associated with the first protruding portion and including a top surface in direct contact with the structural component and a bottom surface disposed on an opposite side of the first cleat member than the top surface and forming a second ground-contacting surface, the first cleat member in contact with the first protruding portion and contained within a wall defined by the first protruding portion; and
    a second cleat member associated with the second protruding portion and forming a third ground-contacting surface, the second cleat member in contact with the structural component and spaced apart from the second protruding portion;
    wherein a distal end of the first protruding portion is flush with the second ground-contacting surface of the first cleat member.

2. The article of footwear according to claim 1, wherein the first protruding portion is integrally formed with the first ground-contacting surface and surrounds the first cleat member.

3. The article of footwear according to claim 1, wherein a distal end of the second protruding portion is spaced apart from the second cleat member by the structural component.

4. The article of footwear according to claim 1, further comprising a third protruding portion extending from the first ground-contacting surface of the outer shell and a third cleat member associated with the third protruding portion, the third cleat member forming a fourth ground-contacting surface.

5. The article of footwear according to claim 4, wherein the structural component extends into the third protruding portion.

6. The article of footwear according to claim 4, wherein the structural component is in contact with the third protruding portion and the third cleat member.

7. An article of footwear having a sole structure, the sole structure comprising:
    an outer shell having a first protruding portion extending from a first ground-contacting surface of the outer shell and including a first aperture at a distal end thereof and a second protruding portion extending from the first ground-contacting surface of the outer shell and including a second aperture at a distal end thereof, the first ground-contacting surface extending continuously from a forefoot region of the sole structure to a heel region of the sole structure;
    a structural component disposed within the outer shell and extending into the first protruding portion and into the second protruding portion, the structural component spaced apart from the first aperture and extending through the second aperture;
    a first cleat member associated with the first protruding portion and including a top surface in direct contact with the structural component and a bottom surface disposed on an opposite side of the first cleat member than the top surface and forming a second ground-contacting surface, the first cleat member being received within the first aperture; and
    a second cleat member associated with the second protruding portion and forming a third ground-contacting surface, the second cleat member being attached to the second protruding portion by the structural component;
    wherein the distal end of the first protruding portion is flush with the second ground-contacting surface of the first cleat member.

8. The article of footwear of claim 7, wherein the second cleat member is spaced apart from the distal end of the second protruding portion by the structural component.

9. The article of footwear of claim 7, wherein the first cleat member is in contact with the first protruding portion.

10. The article of footwear of claim 7, wherein the first protruding portion is integrally formed with the first ground-contacting surface and at least partially surrounds the first cleat member.

11. The article of footwear of claim 7, further comprising a third protruding portion extending from the first ground-contacting surface of the outer shell and a third cleat member associated with the third protruding portion, the third cleat member forming a fourth ground-contacting surface.

12. The article of footwear of claim 11, wherein the structural component is in contact with the third protruding portion and the third cleat member.

13. An article of footwear having a sole structure, the sole structure comprising:
- an outer shell having a first protruding portion extending from and integrally formed with a first ground-contacting surface of the outer shell, a second protruding portion extending from and integrally formed with the first ground-contacting surface of the outer shell, and a third protruding portion extending from and integrally formed with the first ground-contacting surface of the outer shell;
- a structural component disposed within the outer shell and extending into the first protruding portion, the second protruding portion, and the third protruding portion;
- a first cleat member associated with the first protruding portion and including a top surface in direct contact with the structural component and a bottom surface disposed on an opposite side of the first cleat member than the top surface and forming a second ground-contacting surface, the first cleat member in contact with the first protruding portion and received within and surrounded by the first protruding portion;
- a second cleat member associated with the second protruding portion and forming a third ground-contacting surface, the second cleat member being spaced apart from and attached to the second protruding portion by the structural component; and
- a third cleat member associated with the third protruding portion and forming a fourth ground-contacting surface, the third cleat member being in contact with the structural component and a distal end of the third protruding portion;
- wherein a distal end of the first protruding portion is flush with the second ground-contacting surface of the first cleat member.

14. The article of footwear of claim 13, wherein an outer surface of the second cleat member is substantially flush with an outer surface of the second protruding portion and an outer surface of the structural component.

15. The article of footwear of claim 13, wherein the first protruding portion defines a first aperture, the second protruding portion defines a second aperture, and the third protruding portion defines a third aperture.

16. The article of footwear of claim 15, wherein the first aperture is disposed at a distal end of the first protruding portion, the second aperture is disposed at a distal end of the second protruding portion, and the third aperture is disposed at a distal end of the third protruding portion.

17. The article of footwear of claim 16, wherein the structural component extends through the second aperture.

18. The article of footwear of claim 16, wherein the first aperture surrounds the first cleat member.

19. The article of footwear of claim 16, wherein the structural component extends into the second aperture.

20. The article of footwear of claim 19, wherein the structural component is substantially flush with the distal end of the second protruding portion at the second aperture and is in contact with the second cleat member at the distal end of the second protruding portion.

* * * * *